United States Patent [19]

Burhite

[11] Patent Number: 5,116,162
[45] Date of Patent: May 26, 1992

[54] PAVEMENT MAINTENANCE MACHINE AND METHOD

[75] Inventor: Albert G. Burhite, Nekoosa, Wis.

[73] Assignee: B-J Development, Nekoosa, Wis.

[21] Appl. No.: 661,033

[22] Filed: Feb. 25, 1991

[51] Int. Cl.$^5$ ............... E01C 23/08; A01D 34/84
[52] U.S. Cl. ................................ 404/72; 172/15;
172/438; 299/41; 404/90
[58] Field of Search ............ 404/90, 96, 72; 172/14,
172/15, 17, 438; 37/2 R; 56/13.7, 13.8; 299/39, 41

[56] References Cited

U.S. PATENT DOCUMENTS

| | | | |
|---|---|---|---|
| 3,193,996 | 7/1965 | Wellborn | 56/16.9 |
| 3,338,314 | 8/1967 | Meltzer | 172/15 |
| 3,559,742 | 2/1971 | Rogillio, Sr. | 172/15 |
| 3,593,802 | 7/1971 | De Lange, Jr. | 172/15 |
| 3,907,039 | 9/1975 | Remley et al. | 172/15 |
| 4,668,017 | 5/1987 | Peterson et al. | 299/37 |
| 4,786,111 | 9/1983 | Yargici | 299/10 |
| 4,826,352 | 5/1989 | Wirtgen | 404/90 |
| 4,878,713 | 11/1989 | Zanetis | 299/39 |

*Primary Examiner*—David J. Bagnell
*Attorney, Agent, or Firm*—Quarles & Brady

[57] ABSTRACT

A pavement maintenance machine has a side mounted root cutter for cutting subsurface tree roots along the edge of a slab of pavement and a rear mounted pavement milling mechanism for removing an elevated corner of the upheaved slab to eliminate the "toe stubber" hazard created by the corner. The root cutter has a shield which automatically raises and lowers relative to the cutter blade to maintain a certain spacing between the ground and the shield irrespective of the depth of cut of the blade and which automatically covers the blade when the blade is lifted away from the ground. The milling mechanism is anchored to the pavement with the weight of the machine and by a vacuum contact shoe. Once anchored, the milling cutter is fed transversely across the fault to be ground by a guideway and cable/pulley system which amplifies the range of transverse motion the cutter is capable of traversing.

17 Claims, 8 Drawing Sheets

PAVEMENT MAINTENANCE MACHINE AND METHOD

BACKGROUND OF THE INVENTION

1. Field of the Invention

This invention relates to pavement maintenance in general, and more particularly to a pavement maintenance machine for cutting subsurface roots along the edge of pavement and for repairing upheaved edges or corners of the pavement.

2. Discussion of the Prior Art

Pavement, and in particular city sidewalks, are upheaved when the roots of trees growing along side the pavement grows beneath the pavement and exerts upward pressure on it. The pressure is sufficient to lift a slab of pavement above the level of adjacent slabs. This creates a dangerous elevated edge of the sidewalk or "toe stubber" which creates a stumbling block for the user of the pavement. Ultimately, this problem can cause personal injuries and requires periodic repair or replacement of the pavement.

Machines are known for cutting tree roots which grow along the edges of pavement. However, no machines are known which can both cut the tree roots and repair the damage done by them. Thus, a need exists for such a machine.

SUMMARY OF THE INVENTION

The invention provides a pavement maintenance machine, comprising a frame, means on the frame for supporting the frame on a slab of pavement and a root cutter mounted on the frame for being lowered below a ground surface along an edge of the pavement for cutting roots below the ground surface along the edge. A pavement milling cutter is also mounted to the frame for grinding off an elevated edge of the slab of pavement. Therefore, elevated slabs of pavement need not be removed and replaced but can be repaired with a machine of the invention, which can also be used to prevent subsequent damage to the repaired slab by cutting the roots along the edge of the pavement.

In a preferred form, the root cutter includes a circular blade which is rotatably driven about a substantially horizontal cutter axis and the blade is enclosed by a shield which automatically maintains a spacing between the shield and the ground surface regardless of the depth of cut of the root cutter. When the cutter is lowered to the ground, the shield automatically raises to expose the cutter blade and maintain a certain preset spacing between the shield and the ground. If the cutter is lifted out of the ground, the shield automatically lowers to cover the blade as it is lifted. Thereby, a continuous spacing is maintained between the shield and the ground regardless of the depth of cut of the blade and the blade is automatically covered by the shield when the blade is raised for safe performance of the root cutting function of the machine.

In an especially useful form, the blade is mounted on an arm and the arm is pivotally connected to the frame to raise and lower the blade. The shield is pivotally connected to the arm, and a parallelogram linkage maintains the orientation of the shield generally level as the arm and shield are raised and lowered.

In another aspect, the root cutter is mounted along a side of the frame and the milling mechanism is mounted along an end of the frame. Mounted along the side of the frame, the root cutter can be operated while the frame is being moved along the edge of the pavement. In this regard, the frame may advantageously be self propelled. In addition, the rotational axis of the root cutter blade can be made to generally align with the turning axis of the frame to facilitate negotiating corners while performing a root cutting operation.

In another aspect, the pavement milling mechanism includes a cutting element and means for moving the cutting element relative to the frame across an elevated corner of a slab of pavement. The milling mechanism is affixed to the surface of the pavement by a vacuum engagement shoe which forms a seal against the pavement and creates a vacuum engagement force between the pavement and the shoe.

In another useful aspect, the milling mechanism has a lift apparatus for mounting the vacuum shoe to the machine frame so that the elevation of the shoe relative to the machine frame can be varied. The lift apparatus can also be operated to transfer weight of the pavement maintenance machine to the shoe to further anchor the milling cutter. The vacuum shoe is preferably mounted to the elevator frame to pivot about longitudinal and transverse axes relative to the elevator frame so that the shoe can conform to the pavement surface.

In another useful aspect, the orientation of the cutting element is variable about a transverse horizontal axis. Therefore, an elevated corner of the pavement can be milled off at any desired angle to eliminate the toe stubber hazard.

In another aspect, the cutting element is connected to the machine frame through a series of connections including a carriage for mounting the cutting element, a guideway which is transversely reciprocable relative to the frame and a cable and pulley system extending between the guideway, the frame and the carriage. The carriage is transversely reciprocable relative to the guideway, so that for every inch that the guideway is moved in a transverse direction, the carriage is moved two inches. Thereby, the transverse range of motion of the cutting element is substantially amplified over and above its width to allow a milling mechanism which is relatively narrow.

A method of pavement maintenance according to the invention includes identifying slabs of pavement which have been upheaved by tree roots growing under the slabs. Once the slabs have been identified, repair and preventative maintenance procedures including cutting the tree roots along an edge of the slab between the pavement and the tree, and grinding off an elevated corner of the slab to approximately the level of the next adjacent slab are performed, in any order. Therefore, removal and replacement of the upheaved slab is avoided, the toe stubber hazard created by the upheaved slab is eliminated, and subsequent upheaval of the repaired slab is prevented, at least until more roots grow under the slab.

BRIEF DESCRIPTION OF THE DRAWINGS

The following is a brief description of the drawings. A more complete description of the embodiment illustrated follows in the Detailed Description of the Preferred Embodiment section.

In FIGS. 1-13, the hydraulic hoses and control elements (e.g. solenoids, valves, etc.) of the preferred embodiment are not shown for clarity. These elements are shown schematically in FIGS. 14 and 15.

DETAILED DESCRIPTION OF THE PREFERRED EMBODIMENT

Figure 1:
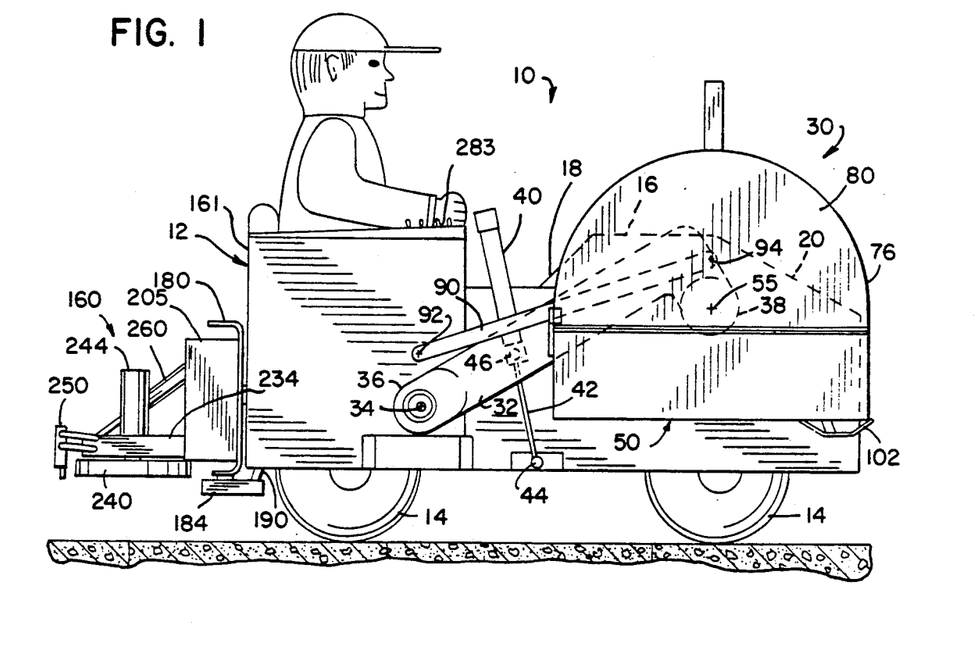
FIG. 1 is a right side elevation view of a pavement maintenance machine of the present invention.
Figure 2:
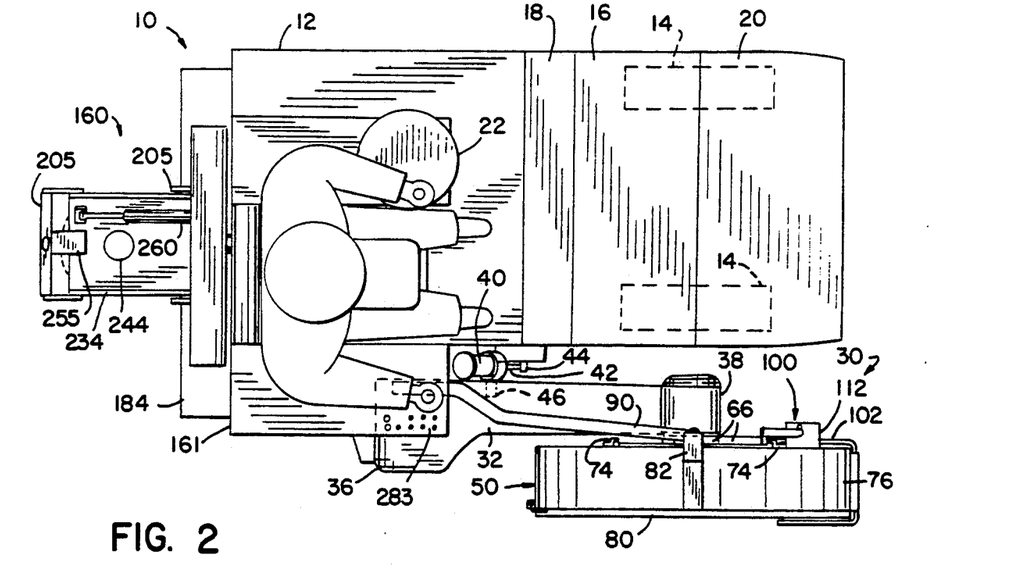
FIG. 2 is a top elevation view of the pavement maintenance machine of FIG. 1.

Referring to FIGS. 1 and 2, a pavement maintenance machine 10 of the invention includes a main frame 12 which is supported upon three (two in front and one in the center in back) ground engaging rubber tired wheels 14. More wheels could, of course, be provided, depending on weight or other considerations. The pavement maintenance machine 10 is provided with a suitable internal combustion engine illustrated in block form at 16, a fuel tank 18 for the engine and a hydraulic fluid reservoir 20. A drive train (not shown) and braking system of any suitable type, many of which are well known, is provided for driving the front two wheels 14, and a steering wheel 22 is provided along with suitable mechanism (not shown) to change the direction, preferably of the rear wheel 14 so that the direction of the pavement maintenance machine 10 can be controlled. Any suitable drive train may be employed to power the front wheels 14, and in the preferred embodiment, a hydrostatic drive is used because it provides for continuously variable speed selection, which is a desirable feature for operating the machine 10 during a root cutting operation to adjust the forward travel speed of the machine according to root cutting conditions. Also in the preferred embodiment, an engine 16 of approximately 55 horsepower was determined to be sufficient.

Provided along the right-hand side of the pavement maintenance machine 10 is a root cutter mechanism 30. The root cutter mechanism 30 includes an arm 32 which is pivotally connected through appropriate bearings at pivot joint 34 to the main frame 12. The arm 32 extends from its pivotally connected end 36 to its cutter mounting end 38. The elevation of the arm 32 is controlled by the extension of trunnion mounted double acting hydraulic cylinder 40, which has the lower end of its piston rod 42 pivotally connected to the main frame 12 at 44 and is pivotally mounted to the arm 32 to pivot about a transverse horizontal axis at trunnion connection 46.

Figures 3, 6:
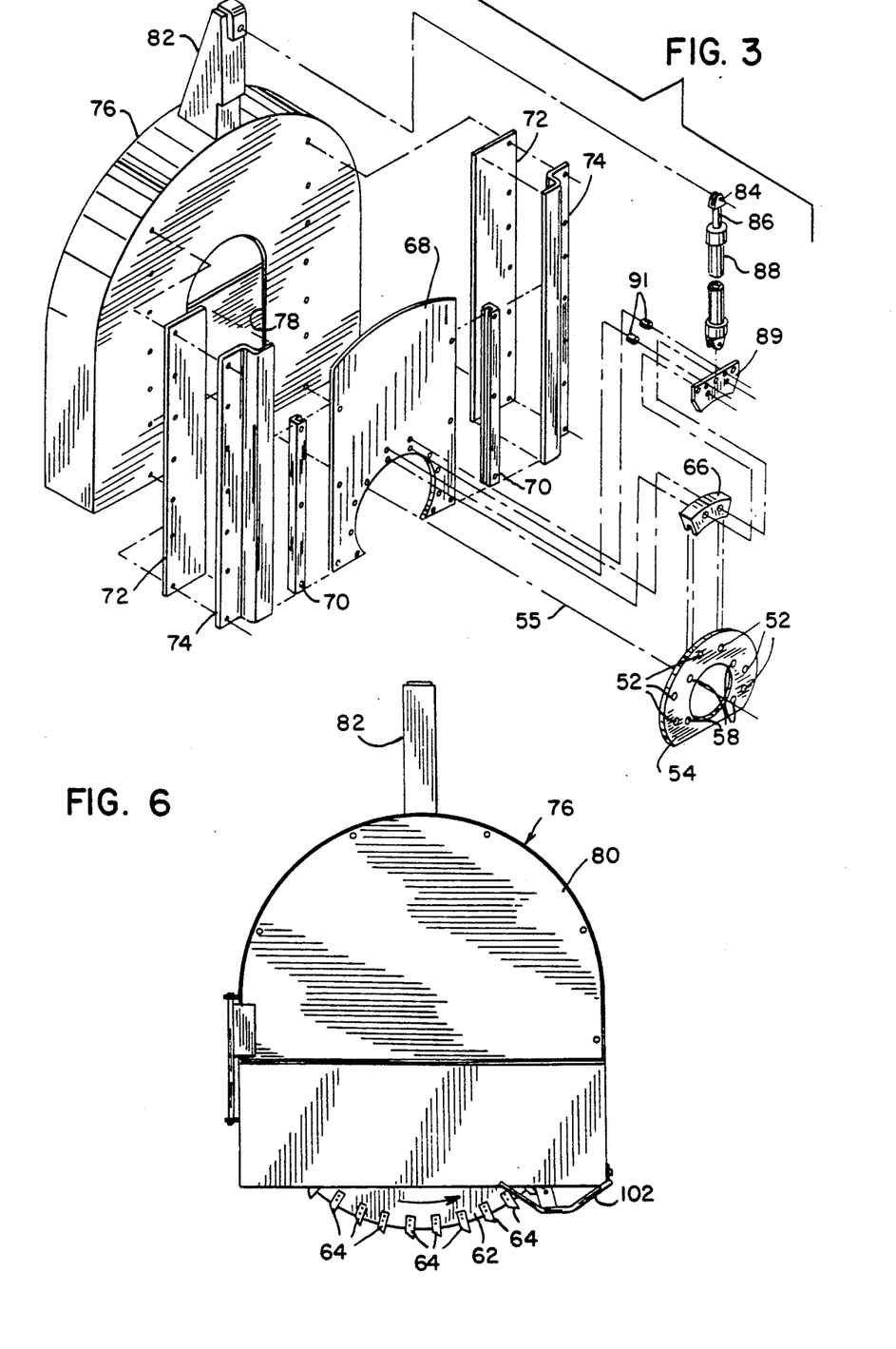
FIG. 3 is an exploded perspective view of a root cutter shield assembly for the pavement maintenance machine of FIG. 1.
FIG. 6 is a right side elevation view of the shield assembly illustrated with the root cutting blade projecting below the shield assembly.
Figures 4, 5:
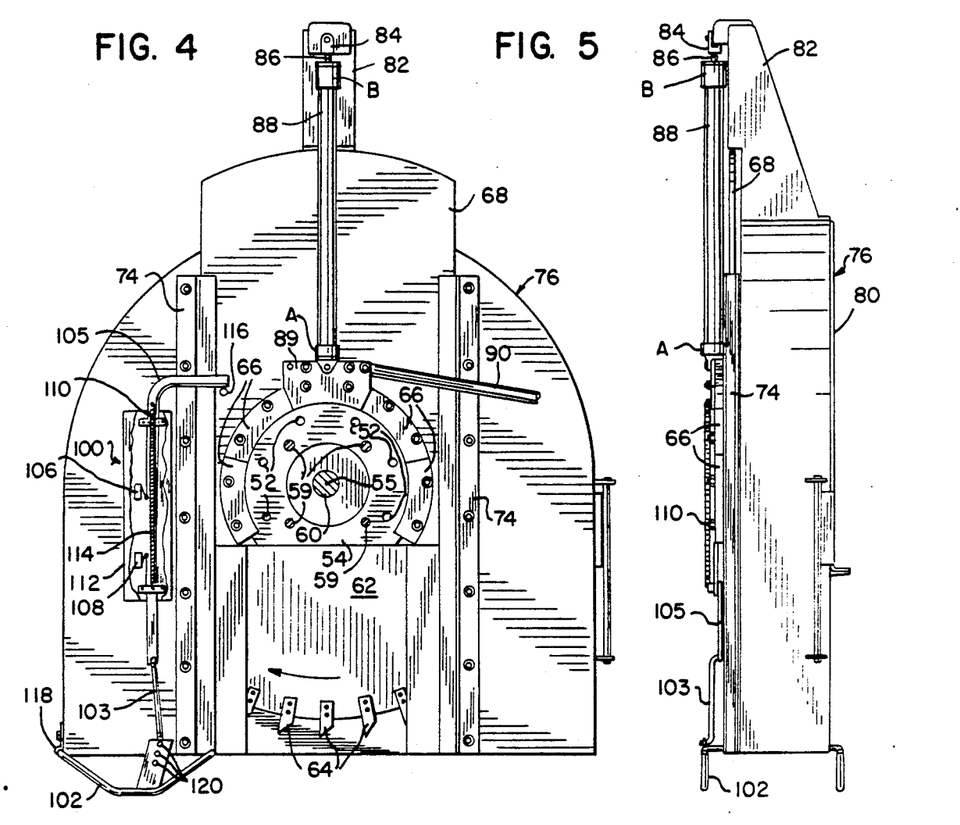
FIG. 4 is a left side elevation view of the shield assembly of FIG. 3 and also showing a root cutting blade housed by the shield assembly.
FIG. 5 is a rear plan view of the shield assembly.

Referring now to FIGS. 3-6, a root cutter assembly 50 is mounted to the end 38 of the arm 32. Outside holes 52 of interface plate 54 are provided so that the plate 54 can be bolted to the end 38 centered on transverse horizontal axis 55 (See FIG. 1). A root cutter drive hydraulic motor (shown schematically and identified by reference numeral 286 in FIG. 15) is housed in end 38 and bolted to inside holes 58 of interface plate 54. In FIG. 4, hydraulic motor 286 mounting bolts 59 and hydraulic motor 286 shaft 60 are shown in section. Also shown in FIG. 4 and also in FIG. 6, a root cutting blade 62 having replaceable cutter blades 64 is mounted by any suitable means to the outer end of the hydraulic motor shaft 60 to rotate (counterclockwise as shown in FIG. 6) about axis 55 as it is driven by the hydraulic motor in end 38. In the preferred embodiment, a hydraulic motor 286 of 29.9 cubic inch displacement operating with a circuit flow rate of 21 G.P.M. at 2000 psi pressure was determined to be sufficient.

Interface plate 54 is circular except that its bottom edge is flat, and its circular edges are slidably received in grooves in arcuate segments 66, which are bolted to a slider plate 68. Elongated slider blocks 70 are affixed by any suitable means such as bolting or riveting to the vertical edges of the slider plate 68 and are slidably captured by track ways made up of wear plates 72 and Z-tracks 74 at each side of the slider plate 68. The wear plates 72 and Z-tracks 74 are fastened to a main shield housing 76.

The main shield housing 76 has a slot 78 at its left side and a door 80 at its right side (as viewed in FIGS. 1 and 2). The door 80 is normally latched shut by suitable means but may be opened to provide access to the root cutting blade 62 housed within the main shield housing 76.

An extension 82 extends upwardly from the top of the main shield housing 76 and a yoke 84 at the end of piston rod 86 of hydraulic cylinder 88 is pinned near the top of the extension 82. The lower end of the hydraulic cylinder 88 is pinned to plate 89 which is fastened to the top arcuate section 66 and therefore also fastened to the slider plate 68. Note that the interface plate 54 is fixed by means of being captured within the arcuate grooves of the arcuate segments 66 relative to the slider plate 68 except for being pivotable about axis 55 relative to the slider plate 68. The hydraulic cylinder 88 therefore controls the elevation of the main shield housing 76 relative to the root cutting blade 62.

The main shield housing 76 is maintained level by a parallelogram linkage including the arm 32 and a linkage bar 90. Linkage bar 90 is pinned to the main frame to pivot about axis 92, which is positioned on a vertical line through the pivot axis 34 of arm 32. At the shield end of the linkage bar 90, the linkage bar 90 is pinned to pivot about axis 94 which is approximately on a vertical line through axis 55. For example, the linkage bar 90 could be pinned to the same pin that connects the lower end of hydraulic cylinder 88 to plate 89, or to any other point on plate 89 such as one of the bushings 91 to keep the shield housing 76 sufficiently level. Therefore, since straight lines between axes 34 and 55, 55 and 94, 94 and 92, and 92 and 34 approximately form a parallelogram, the shield housing 76 will be maintained substantially level in the orientation shown in FIG. 1 as the arm 32 is raised and lowered.

A shield elevation sensing mechanism 100 includes a ground engagement shoe 102, a linkage rod 103, a cam rod 105, switches 106 and 108, extension spring 110 and a control enclosure 112. A control enclosure 112 is secured to the main shield housing 76 and slidably mounts cam rod 105 to slide with its main longitudinal axis vertical. The cam rod 105 is relieved at 114 and the control enclosure 112 mounts limit switches 106 and 108 with their actuator levers riding in the relief 114. When the cam rod 105 moves vertically downwardly from its position shown in FIG. 4, switch 106 is actuated and switch 108 remains deactuated. Conversely, when cam rod 105 moves upwardly, switch 108 is actuated and switch 106 remains deactuated. Extension spring 110 normally biases cam rod 105 downwardly so as to favor actuating switch 106. However, a limit latch pin 116 is provided on the slider plate 68 to engage beneath the end of the cam rod 105 to move the cam rod 105 up into the neutral position shown in FIG. 4 at the downward limit of movement of the main shield housing 76 relative to the cutting blade 62.

The ground engagement shoe 102 has ground contact legs on each side of the main shield housing 76 which extend about an inch below the main shield housing 76 with the cam rod 105 in the neutral position shown in FIG. 4 (neutral is with both switches 106 and 108 deactuated). The shoe 102 is hinged at the forward edge 118 of the shield housing 76 and link 103 adjustably connects the shoe 102 to the bottom of the cam rod 105 to cause the cam rod 105 to follow the vertical up and down motions of the shoe 102. Therefore, when the spacing between the bottom of the housing 76 and the ground surface sensed by the shoe 102 exceeds approximately one inch, the cam rod 105 moves down to actuate switch 106. When the spacing between the bottom of the housing 76 and the ground surface sensed by the shoe 102 is less than approximately one inch, the cam rod 105 moves up from the neutral position shown in FIG. 4 to actuate switch 108. The neutral position shown in FIG. 4, with both switches 106 and 108 deactuated, is maintained so long as the spacing between the bottom of the housing 76 and the ground surface sensed by the shoe 102 remains at approximately one inch. Note that the one inch spacing can be varied by changing the level of attachment of the lower end of the linkage rod 103 in the holes 120 of shoe 102. However, one inch has been found to be adequate to allow sufficient room for dirt and other debris to be cleared away from the root cutting blade 62 as the root cutting blade 62 performs a cutting operation.

Figure 14:
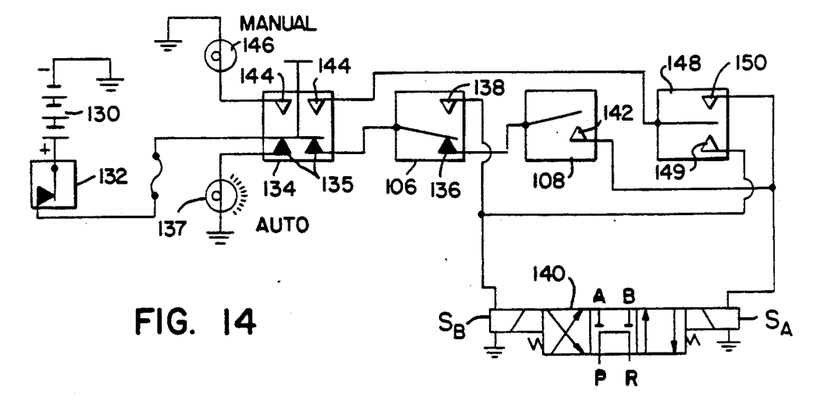
FIG. 14 is a schematic representation of an electrohydraulic circuit for controlling the root cutter shield for the pavement maintenance machine of FIG. 1.

Referring now to the shield height control system shown in FIG. 14, a 12-volt battery 130 provides electrical power to the control system and is preferably recharged by a conventional electrical charging circuit driven by the internal combustion engine 16. The electrical circuit switch 132 of the engine 16 provides a connection between the battery 130 and a double pole double throw switch 134. In an auto position of the switch 134 wherein terminals 135 of switch 134 are connected, an indicator light 137 is illuminated to indicate the auto mode and power is provided to the pole of the switch 106, which is a single pole double throw switch. The normally closed (when deactuated) terminal 136 of switch 106 is connected to the pole of switch 108 which is a single pole single throw switch. The normally open (when deactuated) terminal 138 of switch 106 is connected to solenoid $S_B$ of solenoid actuated valve 140. Normally open (when deactuated) terminal 142 of switch 108 is connected to solenoid $S_A$ of valve 140.

Energization of solenoid $S_A$ of valve 140 causes pressure from port P to be directed to port A of hydraulic cylinder 88 to extend piston rod 86 and thereby raise the shield 76 relative to the cutting blade 62, which exposes the blade 62. Energization of solenoid SB of valve 140 causes pressure from port P to be applied to port B of the hydraulic cylinder 88 which retracts the piston rod 86, thereby lowering the shield 76 relative to the cutting blade 62 to cover the blade. In operation of the valve 140, when one of the ports A and B is connected to the pressure source, the other port is connected to the reservoir R (reference number 20 in FIGS. 1 and 2), as is well known in the art and also illustrated in FIG. 15.

The control circuit of FIG. 14 also provides a manual control mode. To select the manual control mode, switch 134 is switched into its position opposite from that shown in FIG. 14, with its poles connecting terminals 144 In that position, power is provided to illuminate indicator light 46, which indicates the manual mode, and to the pole of single pole double throw momentary contact switch 148, which is spring biased to a center position in which neither of its terminals are connected. This type of switch is sometimes referred to as a joystick. Normally open terminal 149 of switch 148 is connected to solenoid $S_B$ of valve 140 and normally open terminal 150 of switch 148 is connected to solenoid $S_A$ of valve 140 to, respectively, lower and raise the shield housing 76 relative to the cutting blade 62.

As viewed in FIG. 6, rotation of the cutting blade 62 is counterclockwise and the cutting elements 64 are oriented as shown. The diameter of the cutting blade 62 should be sufficient to make a depth of cut of from about 12-18 inches along the edge of sidewalk or other pavement. A cutting diameter of approximately 34 inches for the blade 62 is typical. Note that in this position, as best shown in FIG. 1, the axis 55 of rotation of the cutting blade 62, is generally aligned with the axle of the front pair of ground engagement wheels 14 so as to facilitate turning the vehicle around a curve during a root cutting operation.

In the auto mode of operation, when the arm 32 is lowered, the shoe 102 first contacts the ground surface to initiate raising the housing 76 relative to the cutting blade 62 as the cutting blade 62 is lowered beneath the surface of the ground. This is facilitated by the shoe 102 pushing the rod 105 up to actuate switch 108 which energizes solenoid $S_A$ of valve 140 to extend piston rod 86. This extension continues until the shield is approximately one inch above ground level regardless of the depth of cut of the cutting blade 62. Should the ground surface change so as to reduce the spacing between the housing 76 and the ground surface below one inch, switch 108 would again be actuated to raise the shield 76 relative to the cutting blade 62. Should the ground fall away from the shield 76, extension spring 110 would urge the cam rod 105 downwardly so as to actuate switch 106, which would energize solenoid $S_B$ of valve 140 to retract the piston rod 86, thereby lowering the shield 76 relative to the cutting element 62.

At the end of a root cutting operation, when the arm 32 is raised, shield 76 would initially be raised with the arm 32 until rod 105 moved downwardly sufficiently to actuate switch 106, which begins retraction of piston rod 86 and therefore lowering of shield 76 relative to blade 62. When housing 76 is lowered to the limit of its downward extent relative to blade 62, pin 116 engages the end of rod 105 to lift the rod 105 into the neutral position relative to the switches 106 and 108. In that position, the shield and cutter assembly 50 are once again ready to be lowered to a root cutting position with the shoe 102 again engaging the ground surface to initiate raising of the housing 76 relative to the blade 62 as described above.

At the rear end of the pavement maintenance machine 10, a pavement milling mechanism 160 is provided. The pavement milling mechanism 160 is provided so that after a slab of pavement has been upheaved by roots growing beneath it, the elevated edges of the pavement can be repaired by grinding or milling them off to remove the toe stubber hazard created by the upheaved pavement.

The pavement milling mechanism 160 is attached to a rear panel 161 of the main frame 12 by a lift apparatus that allows raising and lowering the pavement milling mechanism 160 relative to the main frame 12 and substantially transferring all of the weight at the rear of the pavement maintenance machine 10 to the pavement milling mechanism 160. The rear panel 161 of the main frame 12 of the pavement maintenance machine 10 is provided with a central vertical slot 164 which forms a vertical trackway for raising and lowering the pavement milling mechanism 160. A trackway is defined at each side of the slot 164 by angle irons 165 and bars 166 which are bolted to the rear panel 161. A U-shaped frame 168 has a pair of rollers 169 at each side thereof which fit into the trackway at the respective side of the slot 164. Thereby, the frame 168 is constrained to move up and down vertically.

A hydraulic cylinder 170 (FIGS. 7, 11 and 12) is provided which has one end anchored to the main frame 12 via block 172 and the lower end of its piston rod 174 anchored to an extension 176 of the frame 168. The length of stroke of the cylinder 170 is such that the rollers 169 cannot be extended upwardly or downwardly past the trackways formed by the angle irons 165 and bars 166.

A foundation frame 180 is pivotably connected to frame 168 by stud 181 to pivot relative to the frame 168 about a fore and aft extending (longitudinal) substantially horizontal axis through the center of the stud 181. At the lower end of the foundation frame 180, a vacuum contact shoe 184 is pivotally connected by pin 185 to pivot about a horizontal transversely extending axis relative to the foundation frame 180. The combination of being able to pivot about the longitudinally extending horizontal axis through stud 181 and the transversely extending horizontal axis through pin 185 allows the vacuum contact shoe 184 to conform its lower, engagement surface 186 to the pavement surface to which it is to be attached.

Following lowering of the shoe 184 and the transferring of the weight of the machine 10 to the shoe 184 via cylinder 170, a vacuum is applied to the shoe 184 by vacuum hose 190, which is connected to the inlet port of a vacuum pump (not shown) which is driven by the internal combustion engine 16. The shoe 184 is suitably dimensioned to provide a vacuum contact area of approximately 15 inches (longitudinally) by 46 inches (transversely) and commonly available vacuum pumps can provide a vacuum of approximately 26 inches of mercury or more. Thereby, several tons of force can be generated to anchor the foundation frame 180 to the pavement so as to allow milling off the upheaved pavement edge.

The pavement milling mechanism 160 is substantially narrower than the pavement (e.g. sidewalks) which it is intended to mill. Therefore, means are provided for increasing the transverse travel of the cutting wheel 240 beyond its width.

For this purpose, two pairs of vertically spaced apart V-groove rollers are provided extending from the rearward face of the foundation frame 180 The V-groove rollers 192 engage and roll on opposed V-surfaces 193 and 194 of guideway 196. Guideway 196 is made of ends 197 and sides 198 which are appropriately secured together such as by bolting or welding. The guideway 196 also has a pair of opposed V-surfaces 200 and 201 on which two pairs of opposed V-rollers 204 ride. The rollers 204 are secured to the front side of a carriage frame 205.

The carriage frame 205 is moved transversely by means of the connection between the carriage frame 205 and the foundation frame 180. To move the guideway 196 back and forth transversely, a double ended, double acting hydraulic cylinder 210 is provided having a single piston and piston rods 211 extending out through the ends of the cylinder from each side of the piston. This type of hydraulic cylinder is preferred so that the speed of travel in each direction (left and right) is the same. Bar 212 is provided at one end of the cylinder 210 which extends into and floats in slot 214 of the foundation frame 180 (See FIGS. 7 and 9). The piston rod 211 extending from each end of the cylinder 210 is secured by suitable fasteners and angle irons 216 to the guideway 196. Therefore, the cylinder 210 is held transversely stationary by the bar 212 being captured in the slot 214 and the guideway 196 moves transversely unitarily with the piston rods 211 of the hydraulic cylinder 210.

Figures 9, 10:
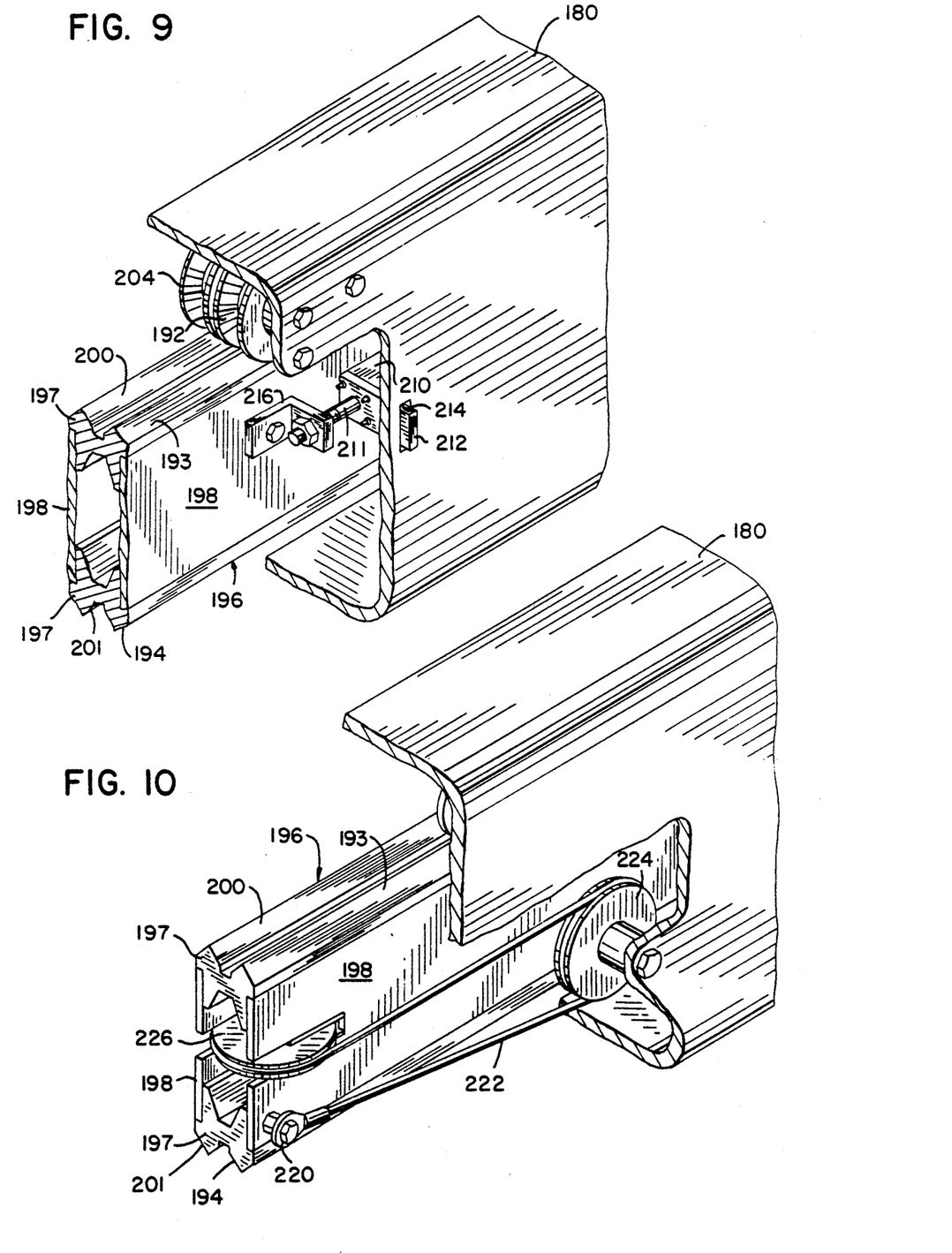
FIG. 9 is a perspective view with portions broken away of a guideway for the milling mechanism of FIG. 7.
FIG. 10 is a perspective view with portions broken away of a cable and pulley system for the milling mechanism of FIG. 7.

The length of travel of the carriage frame 205 is multiplied to twice that of the stroke of the hydraulic cylinder 210 by a pulley system arranged between the foundation frame 180 and the carriage frame 205. The pulley system at each end of the guideway 196 is the same. Referring to FIG. 10 to describe the pulley system at the right end (as viewed facing the rear of the machine 10) of the guideway 196, an end 220 of each cable 222 is secured to the corresponding end of the guideway 196. The cable 222 is then routed around a pulley 224 which is mounted to the foundation frame 180 and rotates about a horizontal longitudinal axis and then around a pulley 226 which is mounted in the end of the guideway 196 to rotate about a vertical axis. The other end 228 of each cable 222 is secured to an extension 230 of the carriage frame 205. Thereby, for every inch that the guideway 196 is moved in either transverse direction from its center position, the carriage frame 205 moves two inches in the same direction.

Figures 7, 8:
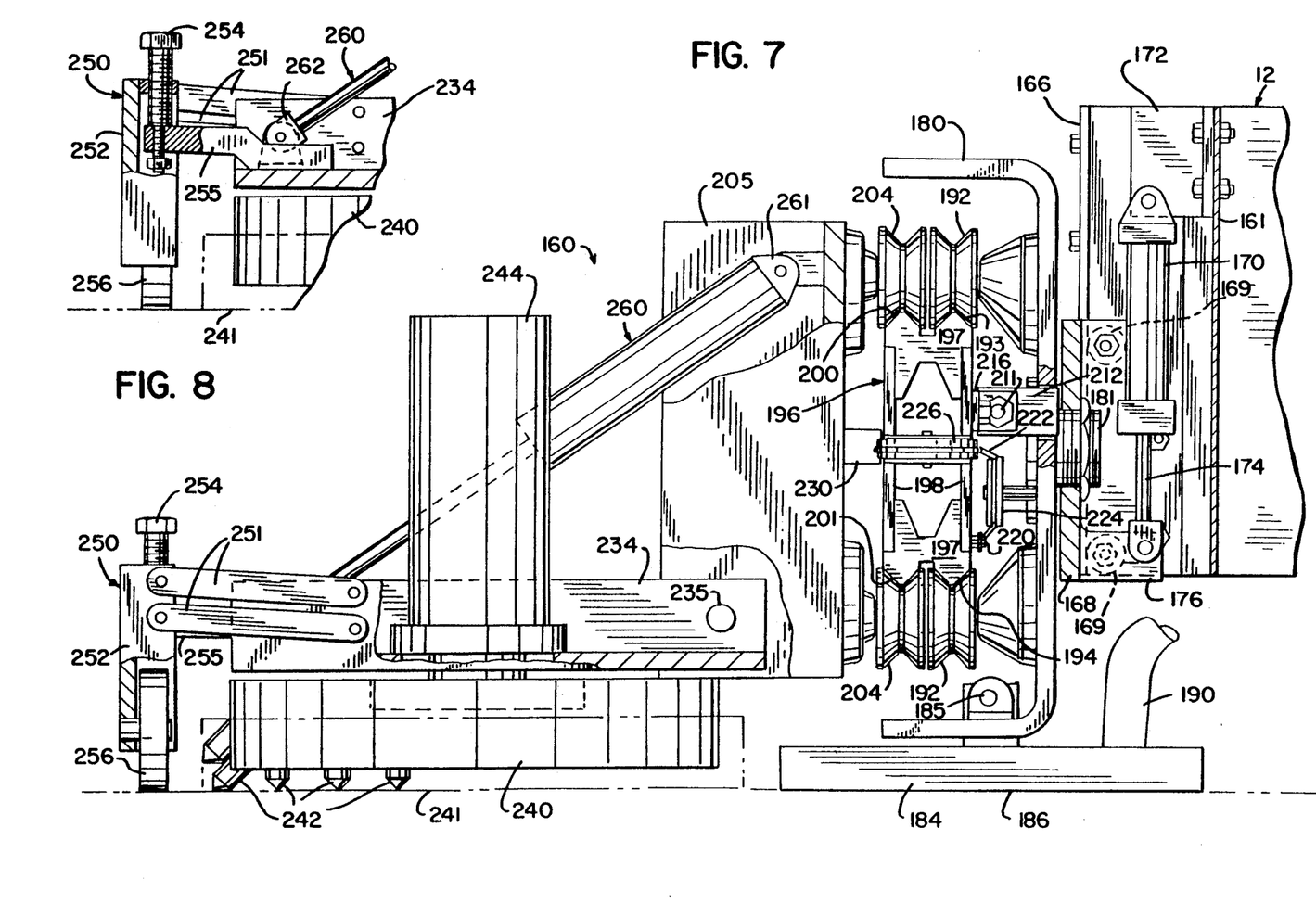
FIG. 7 is a right side detail view with portions broken away of a pavement milling mechanism for the pavement maintenance machine of FIG. 1.
FIG. 8 is a detail view with portions broken away of the milling mechanism of FIG. 7.

A frame 234 is hinged by pins 235 to the lower end of the carriage frame 205 so as to support a cutting wheel 240 with its cutting face 241 at approximately the level of the contact surface 186 of the vacuum contact shoe 184 (See FIG. 7). The cutting wheel 240 has replaceable bits 242, which in the preferred embodiment are carbide tipped, and is supported at the end of the shaft of hydraulic motor 244. The pins 235 are preferably provided with an eccentric bearing surface or other suitable means which allows manual vertical adjustment of the pivot axis of frame 234 to compensate for wearing of cutter bits 242. This adjustment feature permits control of the orientation of cutter wheel 240 relative to vacuum contact shoe 184. The hydraulic motor 244 is secured to the frame 234 and driven by hydraulic fluid provided under pressure by the hydraulic pump (See FIG. 15) which is driven by the internal combustion engine 16. In the preferred embodiment, a hydraulic motor 244 of 19 cubic inch displacement operating with a circuit flow rate of 21 G.P.M. at 3000 P.S.I was determined to be sufficient.

A gauge wheel assembly 250 is provided at the rear end of the frame 234 so that the depth of cut of the cutting wheel 240 can be set. Parallelogram linkage bars 251 pivotably connect each side of gauge wheel assembly frame 252 to the frame 234. An adjustment bolt 254 is threaded through the top of the frame 252 and is secured to an extension 255 of the frame 234 so as to be vertically fixed to the extension 255 but rotatable relative thereto. Therefore, by turning the bolt 254, the elevation of gauge wheel 256 of the gauge wheel assembly 250 can be changed relative to the cutting wheel 240 to set the cutting depth of the wheel 240.

Hydraulic cylinder 260 is pivotally connected at its cylinder end 261 to frame 205 and at its piston rod end 262 to frame 234. The cylinder 260 is a double acting cylinder so that downward pressure can be applied on the frame 234 to keep the gauge wheel 256 in engagement with a reference pavement surface during a milling operation and so that the frame 234 can be lifted pivotally about pins 235 for transport or any other desired purpose.

Figures 11, 13:
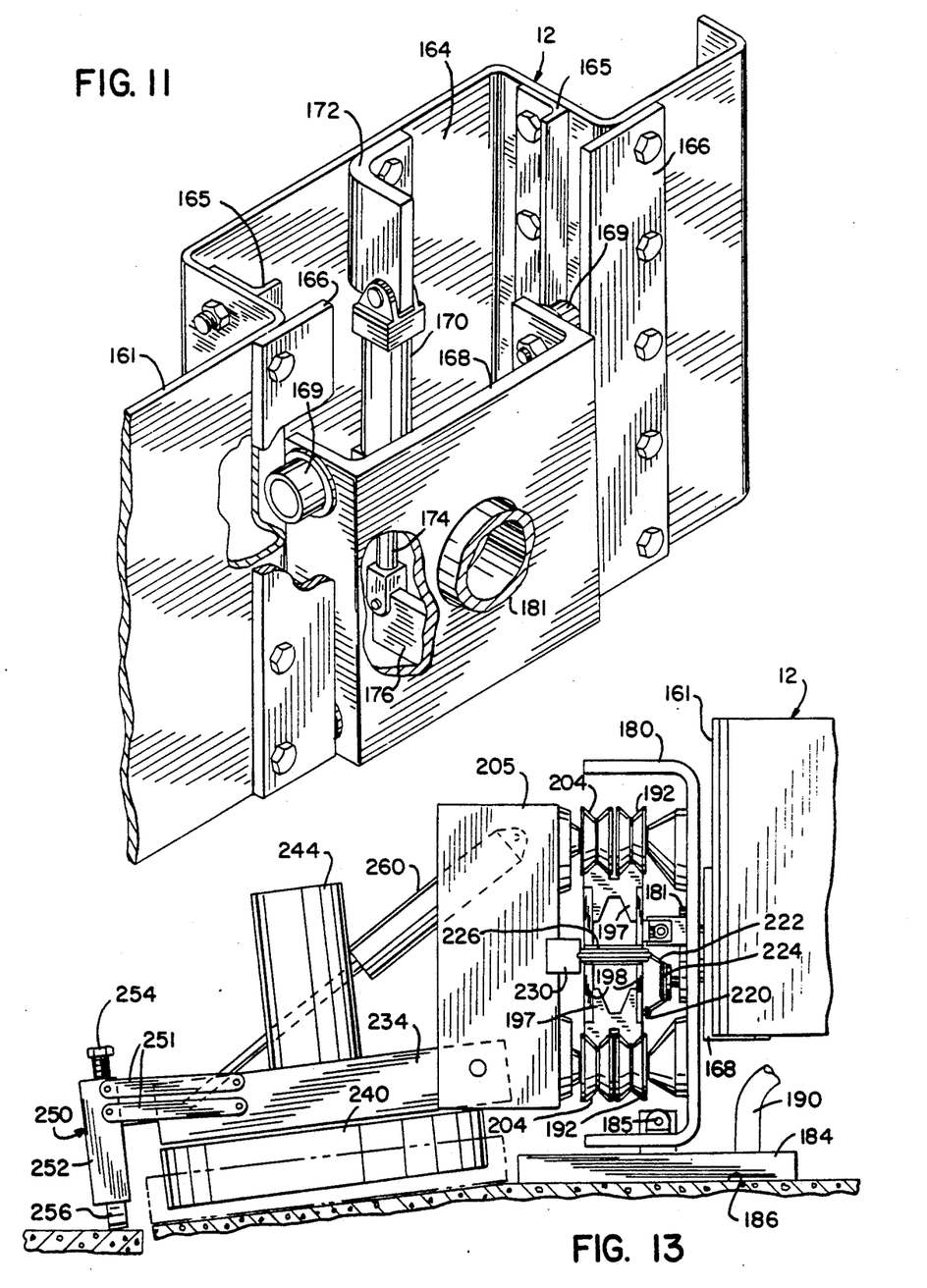
FIG. 11 is a perspective view with portions broken away of a lift apparatus for the milling mechanism of FIG. 7.
FIG. 13 is a right side elevation view of the milling mechanism of FIG. 7 in operation.
Figure 12:
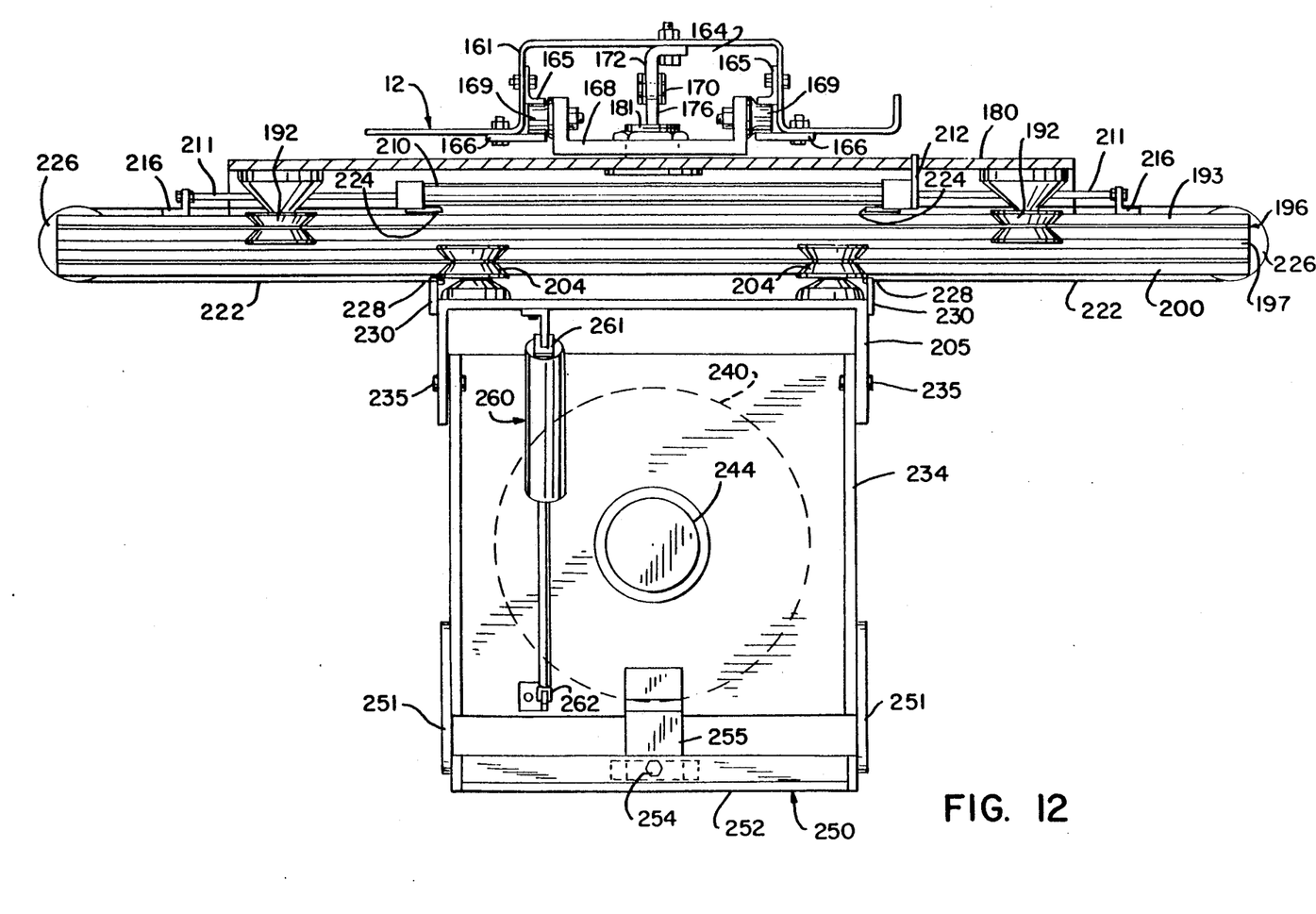
FIG. 12 is a top plan view with portions broken away of the milling mechanism of FIG. 7.

In operation, referring to FIG. 13, the pavement maintenance machine 10 would first be parked and the brakes applied with either the forward or rearward edge of the cutting wheel 240 approximately in alignment with the edge of the pavement surface to be milled. As shown in FIG. 13, the rearward edge of the cutting wheel 240 is in alignment with the edge of the pavement surface being milled. The pavement milling cutter 160 would then be lowered relative to the machine frame 12 by cylinder 170 following which vacuum suction would be applied to the vacuum shoe 184 to properly anchor the pavement milling mechanism 160 to the pavement. Then, the depth of cut would be set using the bolt 254 and the milling operation would be begun, by first energizing the motor 244 and then lowering the frame 234 with the hydraulic cylinder 260 to engage the reference surface with the gauge wheel 256.

It is contemplated that downward pressure would be applied by cylinder 260 throughout the milling operation and that the milling cutter wheel 240 would be moved relatively slowly across the pavement being milled by a metered flow to the cylinder 210, as described with reference to FIG. 15. Once cutting at that depth was completed, if additional milling was required to eliminate the toe stubber hazard, the depth of cut could be readjusted using bolt 254. Note that suitable automatic means, or manual means operable from the operator's seat of the machine 10, could be provided in place of bolt 254 to adjust the depth of cut.

Figure 15:
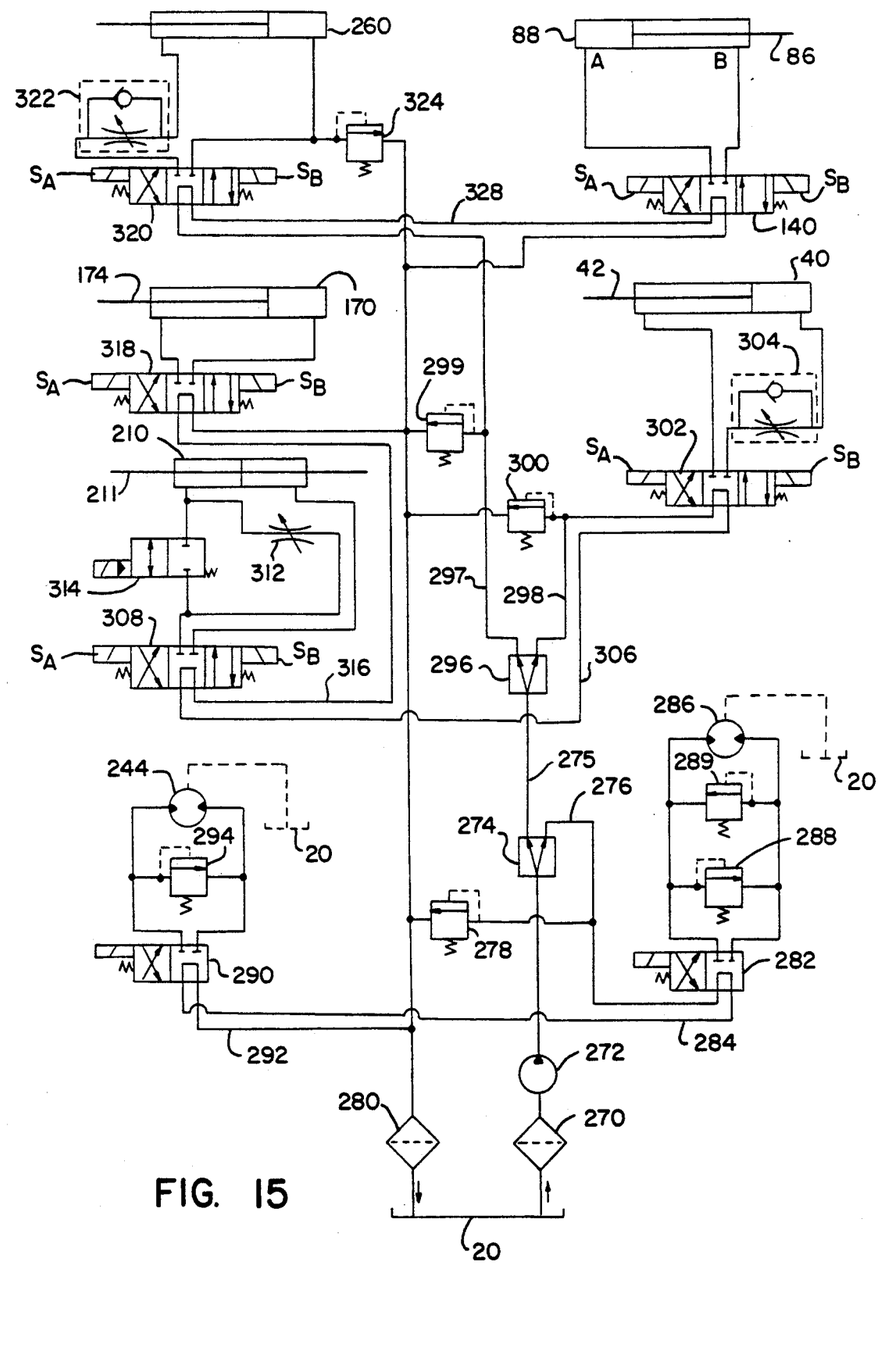
FIG. 15 is a schematic representation of a hydraulic circuit for controlling the root cutting and pavement milling functions of the pavement maintenance machine of FIG. 1.

FIG. 15 schematically illustrates a hydraulic circuit for controlling the root cutting and pavement milling functions of the pavement maintenance machine 10. The hydraulic fluid reservoir 20 provides hydraulic fluid through strainer 270 to hydraulic pump 272, discussed above, which is driven by the engine 16. Hydraulic pump 272 provides hydraulic fluid under pressure to priority flow divider valve 274, whose function is to divide the flow from the input line of the hydraulic pump 272 between lines 275 and 276. The priority flow in circuit 275 remains constant regardless of the load on the system and regardless of the flow entering the valve inlet as long as inlet flow is equal to or greater than the flow calibration of the priority port. The excess flow is diverted to circuit 276. In the preferred embodiment, a hydraulic pump 272 of 23 G.P.M. was determined to be sufficient.

Line 276 is provided with a pressure relief valve 278 to dump to the reservoir 20 (through filter 280) should the pressure in line 276 exceed the limit of the relief valve 278. Normally, however, flow in line 276 is directed to solenoid actuated valve 282, which normally passes flow from line 276 through to line 284. However, if the solenoid of valve 282 is actuated, such as with a manual switch provided on control panel 283 (FIGS. 1 and 2) for the maintenance machine 10, pressurized hydraulic fluid from line 276 is directed through the root cutter hydraulic motor 286 to drive the root cutting blade 62. A pressure relief valve 289 is also provided in the root cutter hydraulic motor 286 circuit so as to protect the motor 286 against excessive pressure. A cross over relief valve 288 in the hydraulic circuit serves as a cushion for stopping rotation of hydraulic motor 286 when solenoid actuated valve 282 is closed.

It may be desirable to provide for an automatic reduction of the forward travel speed of the machine 10 if the motor 286 is placed under a heavy load. This could be accomplished by sensing the inlet pressure of the motor 286 with a pressure actuated valve or other suitable means to automatically reduce the output speed of the hydrostatic drive for the machine 10 in response thereto.

Line 284 is routed from valve 282 to solenoid actuated valve 290, which normally passes the hydraulic fluid through to line 292, which is connected to the reservoir 20 through filter 280. When the solenoid of valve 290 is actuated, hydraulic fluid from line 284 is routed through the milling mechanism hydraulic motor 244 to drive the milling cutter wheel 240. A cross over relief valve 294 in the hydraulic circuit serves as a cushion for stopping rotation of hydraulic motor 244 when solenoid actuated valve 290 is closed. Thus, the control panel for the machine 10 also includes an electrical switch in the control panel 283 to energize the valve 290.

Line 275 from priority flow divider valve 274 is routed to the input of proportional flow divider valve 296. The divider valve 296 equally divides the flow between the lines 297 and 298 and is pressure compensated. Relief valves 299 and 300 are provided for the respective lines 297 and 298 to dump to the reservoir 20 should the pressures in lines 297 and 298 exceed the pressures allowed by the relief valves. Line 298 is connected to a four way three position solenoid operated valve 302 having solenoids $S_A$ and $S_B$. When solenoid $S_A$ of valve 302 is actuated, for example, in one position of a momentary contact single pole double throw switch similar to the switch 148 shown in FIG. 14, which is provided in the control panel 283 for the maintenance machine 10, the arm hydraulic cylinder piston rod 42 is extended to raise the arm 32. In the other position of the momentary contact switch provided in the control panel for controlling the valve 302, the solenoid $S_B$ is actuated to retract the piston rod 42, thereby lowering the arm 32. Note that a flow control valve 304 is provided in the circuit for the cylinder 40 so that the piston rod 42 can be relatively quickly extended to raise the arm 32 but lowering of the arm 32 is adjustably controlled.

In the normal, center position of the valve 302, line 298 is connected to line 306 which routes the flow of pressurized hydraulic fluid to four way three position solenoid operated valve 308. Valve 308 is similar to valve 302 and is controlled by a single pole double throw switch. This switch is provided in the control panel 283 for controlling the transverse motion of the milling mechanism 160. When solenoid $S_A$ of valve 308 is actuated by the switch, the hydraulic cylinder piston rod 211 moves in one direction, and when solenoid $S_B$ of valve 308 is actuated by the switch, the cylinder piston rod 211 is moved in the other direction. An adjustable needle valve 312 is provided in the circuit for the cylinder 210 so that the speed of motion can be adjusted, and a solenoid actuated bypass valve 314 is also provided to bypass the needle valve 312 so that relatively rapid traversing of the milling mechanism 160 can be selected. Thus, if the bypass feature is desirable, a switch would be actuated in the control panel 283 for the machine 10 to energize the valve 314.

In the center position of the valve 308, flow from line 306 is directed to line 316. In the end (energized) positions of the valve 308, the flow from valve 308 is also directed to line 316. Line 316 is routed to four way three position solenoid actuated valve 318, which is for controlling the hydraulic lift cylinder 170 for the milling mechanism 160. The valve 318 is similar to the valve 302 and is also controlled by a momentary contact single pole double throw switch like switch 148, which is provided in the pavement maintenance machine 10 control panel 283. Flow from valve 318 is thereafter routed to the reservoir 20 through filter 280.

Line 297 from priority flow divider valve 296 is routed to four way, three position solenoid actuated valve 320 which controls the carriage orientation cylinder 260. Valve 320 is also similar to valve 302 and is controlled by a single pole double throw switch in the machine control panel. The switch for controlling valve 320 has one pole indented to maintain continuity so that continuous pressure is applied by the cylinder 260 to hold the gauge wheel 256 against a reference surface during a milling operation. The other pole of the switch for valve 320 is momentary. The speed that cylinder 260 can be extended and therefore that the milling cutter can be lowered is limited by flow control valve 322. Pressure relief valve 324 is utilized for pressure regulation of the cylinder 260 hydraulic circuit independent of the hydraulic system pressure. The flow from valve 320 is directed to line 328 and thereby to four way three position solenoid operated valve 140, the electrical circuit for which was described above with respect to FIG. 14. The hydraulic circuit for valve 140 to control the shield elevation cylinder 88 is shown in FIG. 15.

A preferred embodiment of a pavement maintenance machine of the invention has been described in detail above. Numerous modifications and variations to the preferred embodiment described will be apparent to those of ordinary skill in the art which will still be within the spirit and scope of the invention. Therefore, the invention should not be limited to the scope of the foregoing description and drawings, but should be defined by the claims that follow.

I claim:

1. A pavement maintenance machine, comprising:
    a frame;
    means on said frame for supporting the frame on a slab of pavement;
    a root cutter mounted on said frame for being lowered below a ground surface along an edge of said pavement for cutting roots below said ground surface along said edge; and
    a pavement milling mechanism mounted to said frame for milling off an elevated edge of said slab of pavement.

2. A pavement maintenance machine as in claim 1, wherein said root cutter comprises a circular blade which is rotatably driven about a substantially horizontal cutter axis, said blade being enclosed by a shield which automatically maintains a spacing between the shield and the ground surface regardless of the depth of cut of the root cutter.

3. A pavement maintenance machine as in claim 2, wherein said blade is mounted on an arm and said arm is pivotally connected to said frame to raise and lower said blade.

4. A pavement maintenance machine as in claim 3, wherein said shield is pivotally connected to said arm, and a parallelogram linkage maintains the orientation of the shield generally level.

5. A pavement maintenance machine as in claim 4, wherein the shield has a ground engaging shoe that senses the spacing between the surface of the ground and the shield.

6. A pavement maintenance machine as in claim 1, wherein said root cutter is mounted along a side of said frame and said pavement milling mechanism is mounted along an end of said frame.

7. A pavement maintenance machine as in claim 6, wherein said root cutter comprises a circular blade which is rotatably driven about a substantially horizontal cutter axis, and said cutter axis is generally aligned with a turning axis of said frame as said frame is directed around a curve in said edge.

8. A pavement maintenance machine as in claim 1, wherein said pavement milling mechanism includes a cutting element and means for moving said cutting element relative to said frame across an elevated corner of a slab of pavement.

9. A pavement maintenance machine as in claim 8, further comprising means for affixing said pavement milling mechanism to a slab of pavement.

10. A pavement maintenance machine as in claim 9, wherein said affixing means includes a vacuum engagement shoe for engaging the surface of the pavement with a seal and creating a vacuum engagement force between the pavement and the shoe.

11. A pavement maintenance machine as in claim 10, further comprising a lift mechanism for mounting said vacuum shoe to said machine frame so that the elevation of said shoe relative to said machine frame can be varied.

12. A pavement maintenance machine as in claim 11, wherein said vacuum shoe is mounted to an elevator frame to pivot about a substantially horizontal axis relative to said lift mechanism.

13. A pavement maintenance machine as in claim 12, wherein said vacuum shoe is also mounted to pivot about a transverse horizontal axis relative to said elevator frame.

14. A pavement maintenance machine as in claim 11, wherein the orientation of said cutting element is variable about a transverse horizontal axis.

15. A pavement maintenance machine as in claim 8, wherein said cutting element is connected to said machine frame through a series of connections including a carriage for mounting said cutting element, a guideway which is transversely reciprocable relative to said frame, said carriage being transversely reciprocable relative to said guideway, and a cable and pulley system extending between said guideway, said frame and said carriage.

16. A pavement maintenance machine as in claim 1, further comprising means for propelling said machine along said edge during a root cutting operation at a continuously variable travel speed.

17. A method of maintaining pavement comprising: identifying slabs of pavement which have been upheaved by tree roots growing under said slabs, cutting said tree roots along an edge of said slab between said pavement and said tree, and milling off an elevated corner of said slab to approximately the level of the next adjacent slab.

* * * * *